Dec. 9, 1969  V. H. GOULTER  3,482,735
SEED SOWER OR OTHER DISTRIBUTING DEVICE
Filed Dec. 29, 1967  7 Sheets-Sheet 1
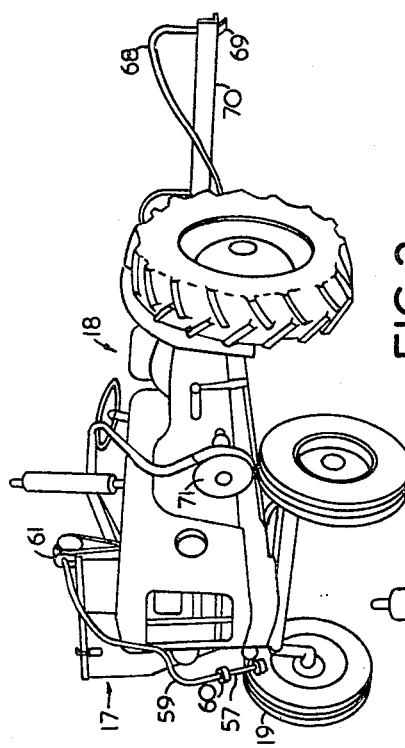
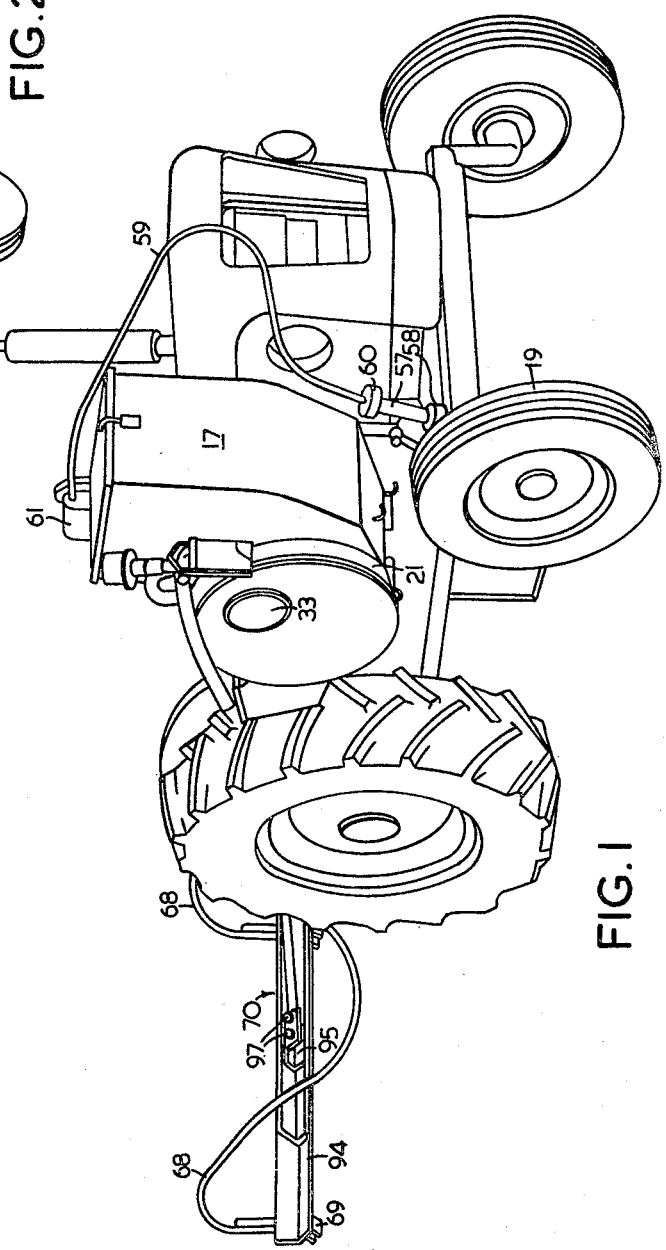

Dec. 9, 1969  V. H. GOULTER  3,482,735
SEED SOWER OR OTHER DISTRIBUTING DEVICE
Filed Dec. 29, 1967  7 Sheets-Sheet 4

Dec. 9, 1969  V. H. GOULTER  3,482,735
SEED SOWER OR OTHER DISTRIBUTING DEVICE
Filed Dec. 29, 1967  7 Sheets-Sheet 5

Dec. 9, 1969  V. H. GOULTER  3,482,735
SEED SOWER OR OTHER DISTRIBUTING DEVICE
Filed Dec. 29, 1967  7 Sheets-Sheet 6
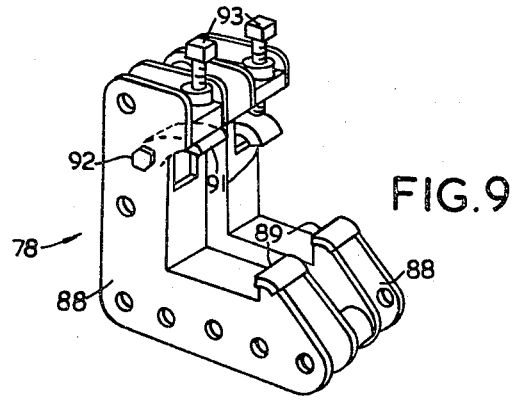
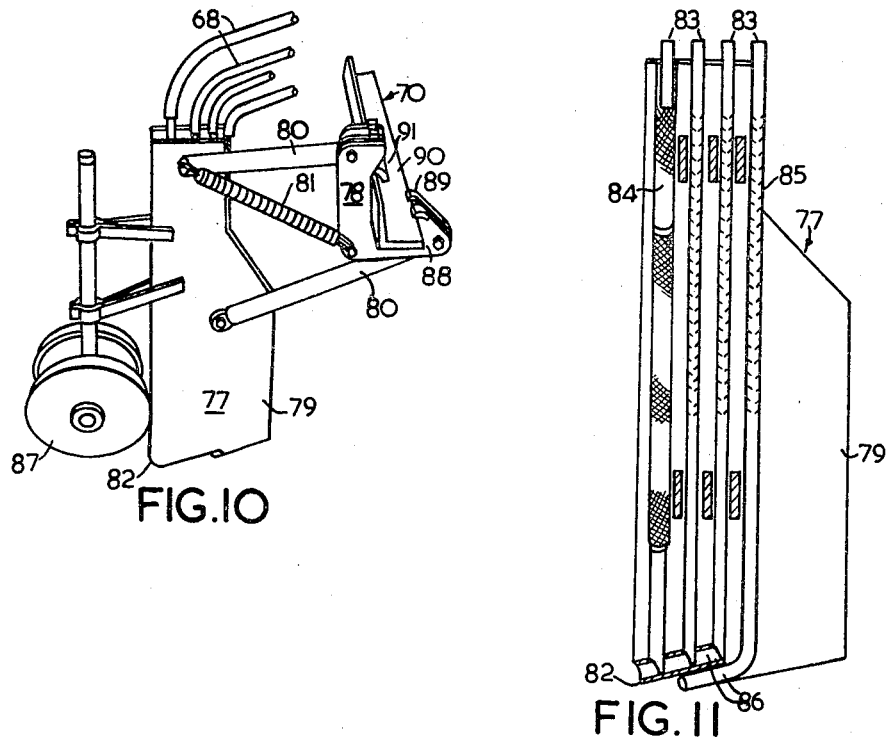
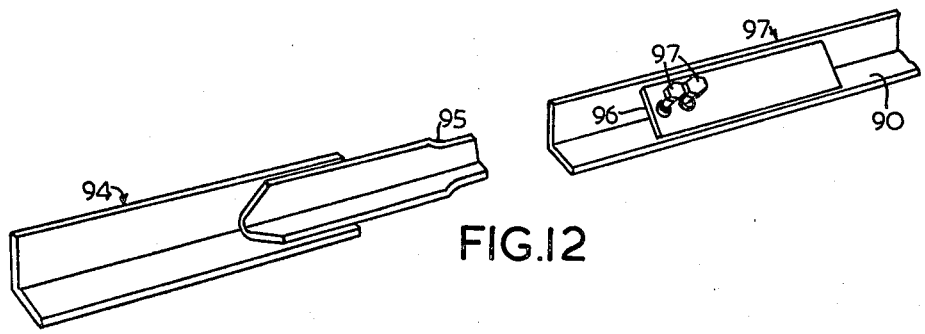

United States Patent Office 3,482,735
Patented Dec. 9, 1969

3,482,735
SEED SOWER OR OTHER DISTRIBUTING
DEVICE
Victor Harold Goulter, Jacksons Flat,
New South Wales, Australia
Filed Dec. 29, 1967, Ser. No. 694,497
Claims priority, application Australia, Jan. 3, 1967,
16,053/67
Int. Cl. A01c 7/06, 15/04
U.S. Cl. 221—211
3 Claims

ABSTRACT OF THE DISCLOSURE

The invention comprises a pneumatically operated machine adapted for fitment to an agricultural tractor, which machine collects seed, fertilizer or soil conditioning agents or admixtures of such granular materials from a container and delivers same to tilled land or to a pasture characterized in that a driven rotor member is located within the container, said rotor member being hollow and provided with external orifices and being connected to both the inlet and exhaust sides of an air pump; said rotor-member in predetermined sequence being subjected to suction to collect seed or other granular materials and then to pressure to discharge the collected seed or other granular materials through a plurality of discharge openings in the container and through discharge tubes connected with the discharge openings to a sowing point.

The mode of sowing of seed and distribution of any accompanying or separately delivered fertilizer or soil conditioning, may be on to prepared furrows or broadcast as may be desired.

In some circumstances the air pressure in the delivery tubes is augmented by a secondary air-blower, separate from the fundamental air pump whose inlet and exhaust are tied with the function of the rotor member.

BACKGROUND OF THE INVENTION

Field of the invention

The field of the invention is in the planting of seed of food or pasture crops in a controlled manner to achieve desired density of plant populations having regard to the productivity of a given soil type and the character of a crop being sown.

Description of prior art

The applicant is unaware of any pneumatically operated equipment for the collection of seed, fertilizer or other granular materials under suction and discharge of such materials to a point of use under air pressure.

SUMMARY OF THE INVENTION

In practice, in accordance with one preferred form of the invention, a seed sowing machine comprises a container for the seeds and a rotary member therein with tubes projecting from its peripheral surface (or with holes in its peripheral surface equivalent to tubes) together with means to rotate such member continuously and to supply suction and air pressure alternately to the interior of the rortary member and the tubes (or holes) as the rotary member rotates, there being openings in the wall of the container by which the seeds may be discharged from the latter and the air pressure being applied to the tubes to eject the seeds when each tube (or hole) comes opposite one of the openings during rotation of the rotary member.

While the air pressure within the rotary member may suffice to eject the seeds from the container and they may be delivered by gravity or other means through the openings in the latter, it is preferred to maintain a super-atmospheric pressure within the container which assists in ejecting the seeds, the suction and pressure previously mentioned being in excess of the generally maintained air pressure within the container.

BRIEF DESCRIPTION OF DRAWINGS

Preferred constructional embodiments of the invention are illustrated in the accompanying drawings in which:

FIGURE 1 is a front perspective view of a typical tractor with the seed sowing device mounted thereon and connected to a tool-bar at the rear of the tractor;

FIGURE 2 is a perspective view of the opposite side of the tractor shown in FIGURE 1;

FIGURE 9 is a perspective view of a double tool carrier normally associated with the tool bar;

FIGURE 10 is a perspective view of a soil opening tool incorporating seed delivery tubes;

FIGURE 11 is an elevation in section of a soil opening tool;

FIGURE 12 is a perspective view of the tool bar and extension thereof;

DESCRIPTION OF PREFERRED EMBODIMENTS

Figure 3:
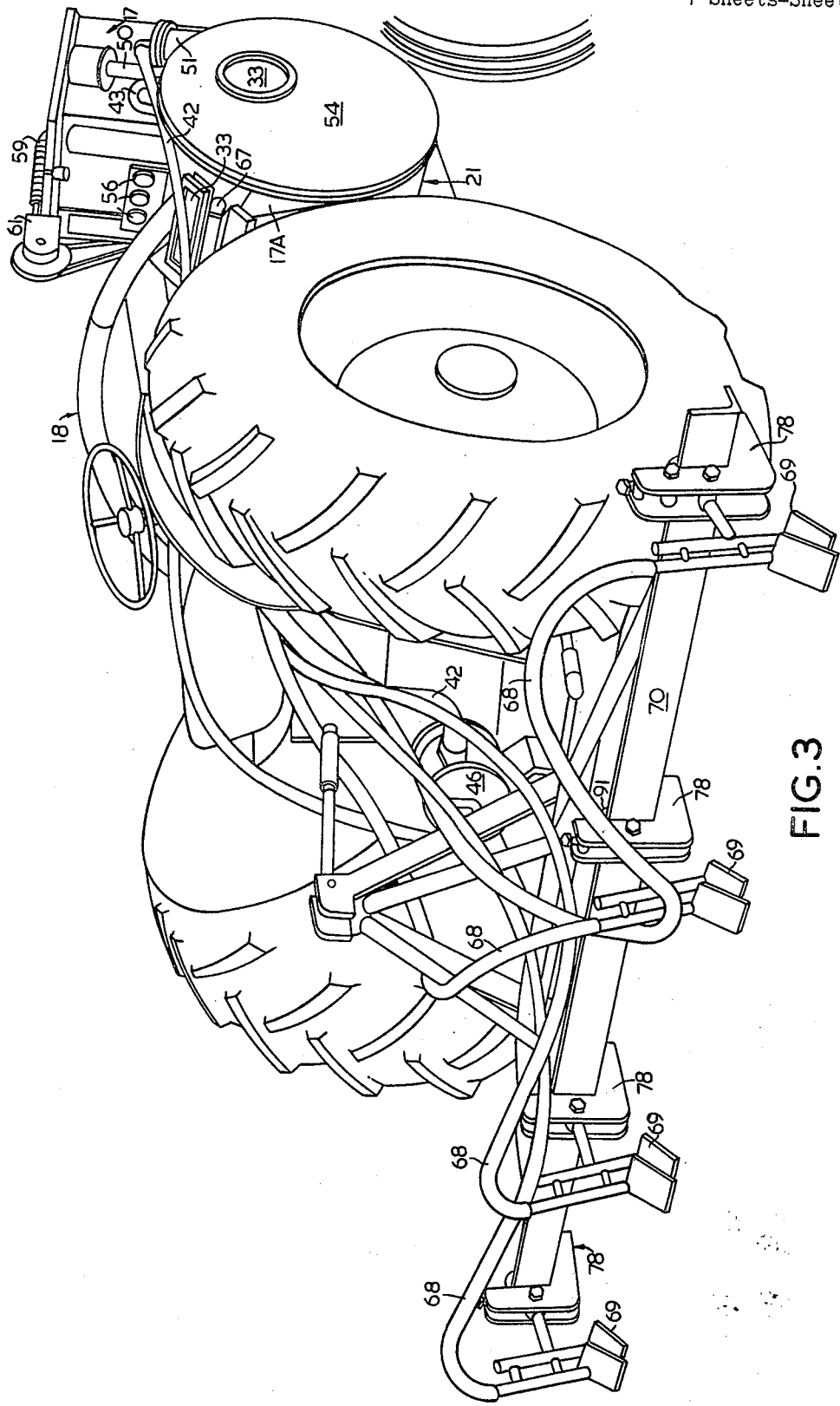
FIGURE 3 is a perspective view of the rear of the tractor showing the tool-bar and seed delivery tube connections with seed scattering tools.

Referring particularly to FIGURES 1 and 2 a seed sower hopper 17 is mounted upon the side of a tractor 18. The front wheel 19 of the tractor 18 is arranged to drive a shaft 20 extending through a cylindrical container 21 and there is a change speed gear, to be described later, to control the rate of rotation of said shaft 20 to varying degrees as the tractor 18 moves along, thus varying the rate of discharge of seed to the ground.

Figure 4:
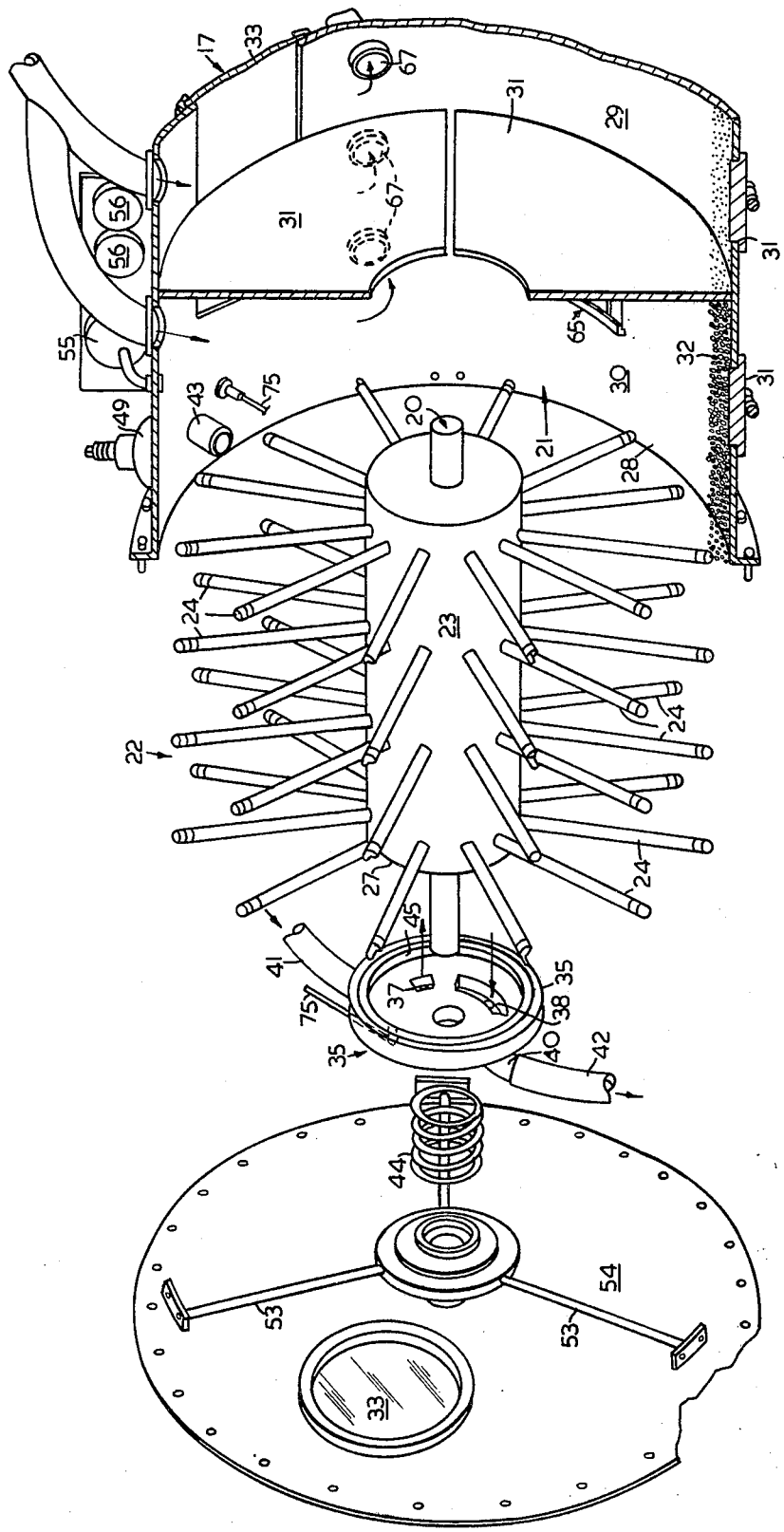
FIGURE 4 is an exploded fragmentary perspective view of the principal parts of the seed sower.

Upon the shaft 20 (see FIGURE 4) there is mounted a rotor 22 composed of a cylindrical hub 23 with numerous tubes 24 projecting radially from this rotor 22.

Figure 8:
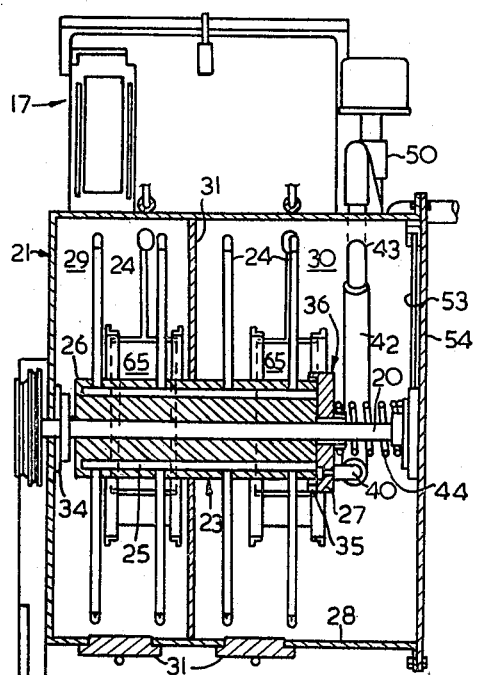
FIGURE 8 is an elevation in section on the line 8—8 in FIGURE 7.
Figure 13:
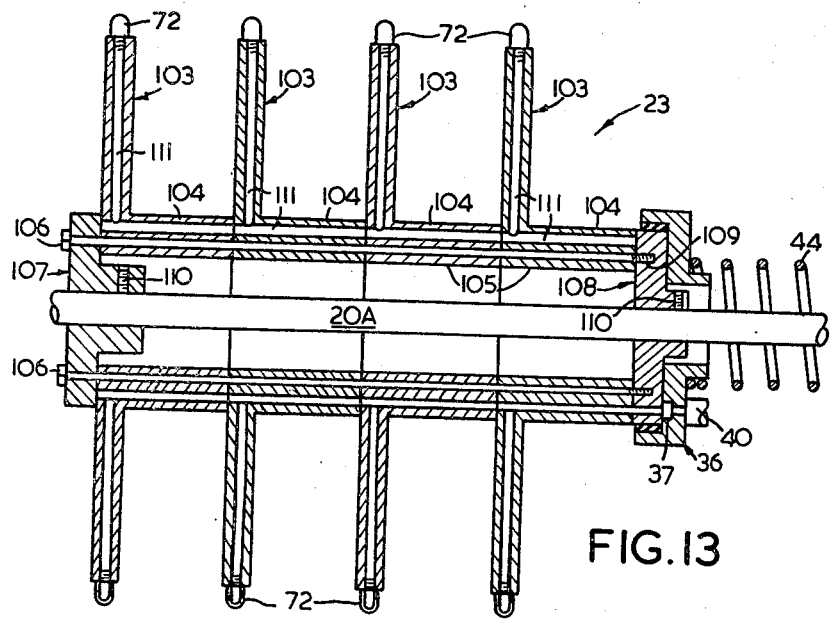
FIGURE 13 is a side elevation in section of an alternative form of rotor member.
Figure 14:
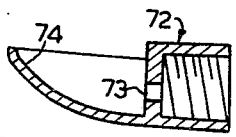
FIGURE 14 is a section view of a seed jet incorporating a scoop.
Figure 15:
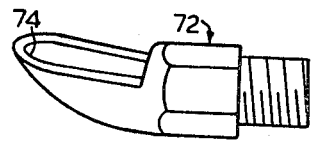
FIGURE 15 is a side view of the jet shown in FIGURE 14.

These radial tubes 24 enter longitudinal bores 25 (see FIGURE 8) formed longitudinally in the rotor hub 23 and extending from end to end of the latter, such longitudinal bores 25 are closed at one end 26 and at the other end communicate with the end face 27 of the rotor hub 23. Thus suction or pressure applied to one of the longitudinal bores 25 through its open end at 27 will apply suction or pressure to all the radial tubes 24 whose ends enter a particular longitudinal bore 25.

The tubes extend to within one inch or so of the inner wall 28 of the container 21.

The container 21 is divided into separate compartments 29 and 30 by dividing walls 31 within its interior, two rows of radial tubes 24 being positioned in each compartment 29 and 30.

There are removable plugs 31 at the bottom of each compartment 29 and 30 of the container 21 whereby seeds 32 or fertilizer may be cleared from each section 29 or 30 of the container 21 when desired. These and other openings in the container should be made substantially air-tight. Insection windows 33 may be provided in the container 21 to enable the operation of the seed pick-up and ejection to be checked.

At one end the rotor axle 20 passes through an air seal and thrust bearing 34, preventing the escape of air and axial displacement at that end.

At its other end (which is the end open to the bores 25) the end 27 of the rotor hub 23 enters the rim 35 of a distributor plate 36 which has two arcuate slots 37 and 38 (which may be of different lengths) opening respectively into two chambers 39 and 40 at the outer surface of the plate. There are flexible hoses 41 and 42 connected to these chambers and extending out through glands 43 in the wall of the container.

Axial displacement of the distributior plate 36 is prevented by a spring 44 which applies pressure to the distributor 36 towards the rotor hub 23. Dust seals 45 (see FIGURE 4) may be fitted between the distributor plate outer flange 35 and the rotor hub 23.

Figure 5:
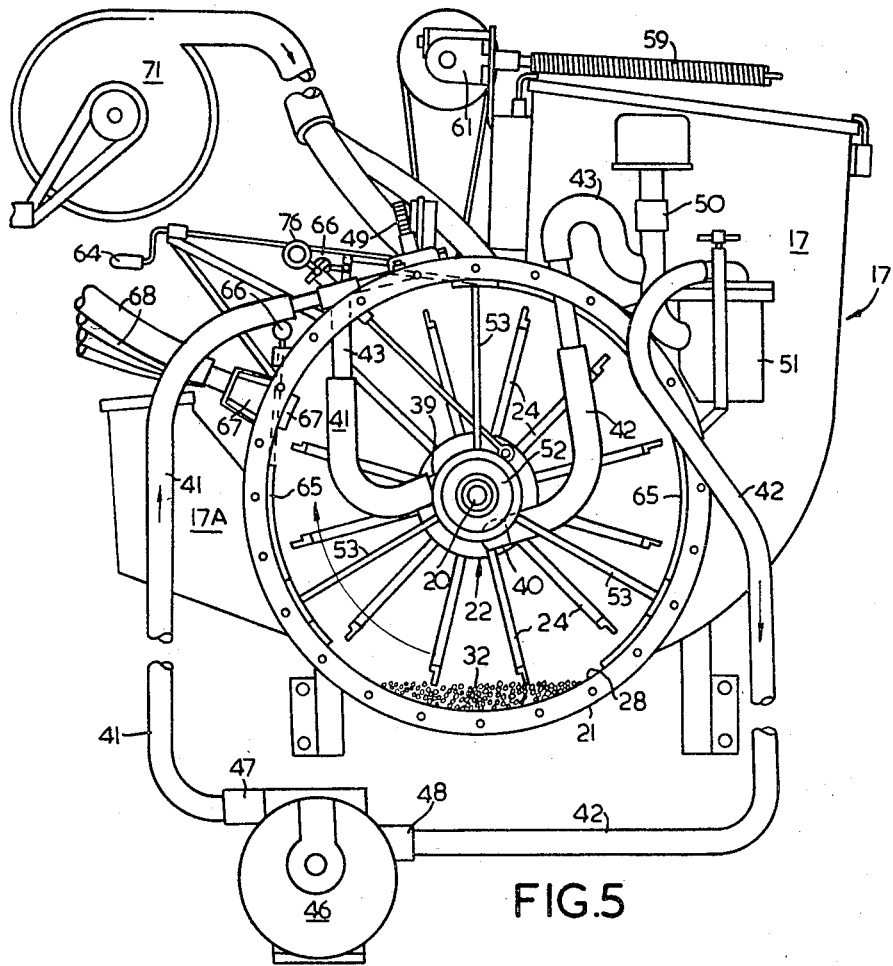
FIGURE 5 is a side elevation of the seed sower with a cover plate removed.
Figure 6:
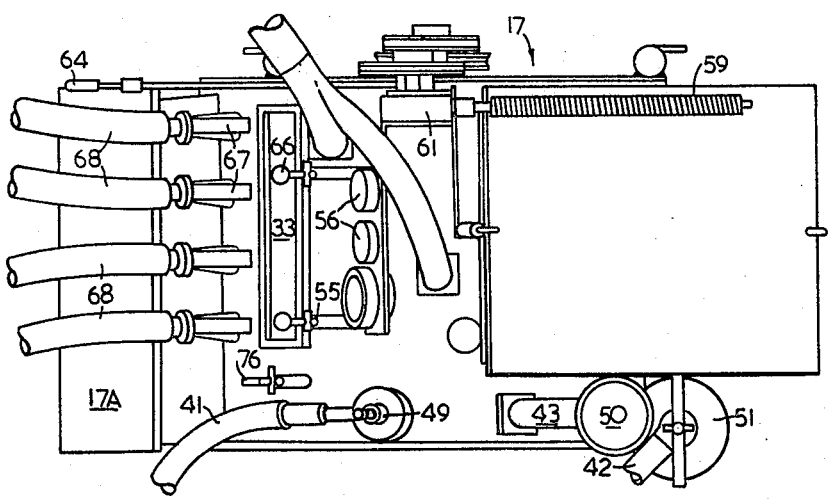
FIGURE 6 is a plan view of the seed sower shown in FIGURE 5.

A vacuum pump 46 (see FIGURE 5) is mounted on the rear power take off of the tractor 18 and the hose 41 is connected to the pressure port 47 of the pump 46, and the hose 42 is connected to the suction port 48 of said pump.

A pressure relief valve 49 is mounted in the hose 41 and a suction relief valve 50 and air cleaner 51 is mounted in the suction hose 42.

The axle 20 at the distributor plate 36 is carried by a bearing 52 mounted on spider arms 53 which fit inside the container 21.

The bearing 52, plate 36 and spider arms 53 fit at the distributor end and support the rotor axle 20. The spider arms 53 fit inside the container 21. This enables the container end plate 54 to be removed for maintenance, without dislodging any of the internal components. Revolution counters 55 and pressure and suction gauges 56 may be fitted to the top of the container 21.

The rotor 22 is adapted to be driven from the front wheel 19 of the tractor 18 because there is normally no slippage associated with a front wheel.

A bearing sleeve 57 is secured to the tractor frame and carries a friction disc 58 which is spring loaded against the front wheel 19. The disc 58 drives a flexible shaft 59 through a ratchet device 60, of known form, which ensures that the rotor 22 is driven only when the tractor is moving forwardly.

Figure 7:
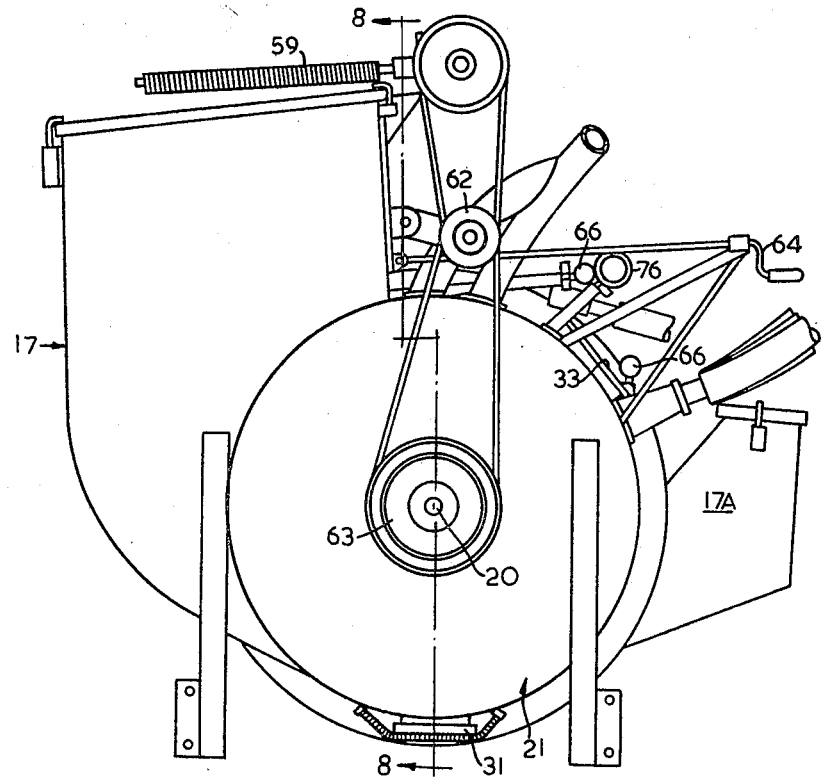
FIGURE 7 is a rear elevation of the seed sower shown in FIGURES 5 and 6.

The flexible shaft 59 drives a gear box 61 mounted on top of the hopper 17. From the gear box the drive is taken by a V belt to expanding pulley 62 (see FIGURE 7), and thence to a pulley 63 on the outer end of the shaft 20. The effective diameter of the pulley 62 is controlled by a lead screw and handle 64 so that the angular velocity of the rotor 22 can be adjusted by the tractor opeartor.

Thus as the rotor 22 rotates the ends of the longitudinal bore 25 therein come opposite one or other of the arcuate slots 37 and 38 and are exposed to suction or air pressure and so are the radial tubes 24 connected with them.

The lower part of the container 21 is filled with seeds 32 and there are arrangements to supply seeds to the interior of the container 21 from the main hopper 17 carried by the seed sower or from a smaller auxiliary hopper 17A.

Circumferential sliding doors 65 control the entry of seeds 32 from the hoppers 17 or 17A into the container 21. The doors 65 are controlled by knobs 66 outside the container 21.

As the rotor 22 rotates one or more seeds 32 are therefore drawn into the tubes 24 as they pass through the mass of seeds 32 and then when the tubes have risen above the level of the seeds in the container 21 the condition of suction changes to that of pressure and the seeds are expelled through openings 67 in the wall of the container 21 and pass thence down tubes 68 extending to earth opening tynes 69 such as provided upon conventional seed sowers.

Seeds may simply fall down the tubes 68 but preferably a pressure of about 2 lbs. per square inch above atmosphere is maintained within the container 21 by a blower 71 driven by the tractor engine which is not enough to prevent the ejection of the seeds under 10 lbs. per square inch pressure but assists in the expulsion of the seeds once they have entered the delivery tubes.

The tynes 69 are preferably mounted upon a tool bar 70 carried by the machine 18, such tool bar 70 being adjustable in length and the tynes being adjustable thereon.

The ends of the tubes 24 are fitted with jet inserts 72 bored with a metered hole 73 so that only a single seed can be retained (for example, of maize). The jets 72 may be formed with integral scoops 74 which will engage a group of smaller seeds such as grass seeds or a desired quantity of granular fertilizer or the like. Said metered hole may, for some purposes, be covered with a gauze-like restriction to prevent seed passing into the tubes.

It will be appreciated that because of the delivery by air pressure both fertilizer and seeds can be delivered from different sections 29 or 30 of the container 21 at the same time and all led to common delivery tubes 68 for simultaneously sowing seeds and fertilizer.

It will be appreciated that a very even distribution of seeds 32 may be achieved by the machine of the present invention, since each rotating tube 24 will pick up the same quantity of seed for each revolution.

To adjust the quantity of seeds 32 to be delivered to the soil the rate of rotation of the rotary member 22 may be varied (as above indicated) or some of the radial tubes or longitudinal bores may be cut off from suction and pressure so that they become inoperative.

To ensure that the seeds 32 are ejected through the openings in the container wall the point of applying the raised pressure to the tubes 24 can be adjusted by turning the distributor plate 36 slightly and a push rod 75 secured to the plate 36 passes through the container wall to a control knob 76 which can be moved by the operator to affect this control.

Distributor plates 36 may be fitted to both ends of a rotor 22 of substantial length. The timing of both such distributors is then synchronized.

The air required is supplied by the air blower 71 and vacuum pump 46 such as employed on milking machines and carried by the tractor, being driven by an auxiliary motor or by the tractor 18.

In the arrangement shown in FIGURE 3, the seeds and/or fertilizer after expulsion under air pressure to delivery tubes 68 are scattered over the ground by the plates 69 rather than passed down into the ground itself.

Harrowing and rolling devices, as shown in FIGURES 10 and 11, may also be mounted upon tool bar 70 to cover the seed after scattering upon the surface of the ground or when located in an opened furrow. The soil opener 77 shown in FIGURES 3, 10 and 11, is mounted on a tool carrier 78 mounted on the tool bar 70. The soil opener comprises vertical plates 79 and is supported on articulated arms 80 which are loaded by a spring 81 so that the cutting point 82 is forced into the ground. Four delivery tubes 83 extend down between the plates 79 and the hoses 68 are secured to the upper ends of the tubes 83. To allow the air, entering said tubes 83, to escape, gauze covers 84 or angled slots 85 may be provided. The lower ends 86 of the tubes 83 are turned at right angles to the direction of advance of the tractor so that seeds and/or fertilizer is fed along the furrow formed by the plates 79. The furrow is filled in by soil pressing wheels 87 mounted behind the plates 79.

The tool carriers 78 are also shown in FIGURES 9 and 10 and comprise L shaped plates 88 with fixed lips 89 which engage the horizontal flange 90 of the tool bar 70. A radial clamping arm 91 is pivotally mounted at 92 between the plates 88 and said arm 91 can be forced down by a set screw 93 so that the carrier 78 is locked to the bar 70.

The tool bar 70 can be extended at either end by extension pieces 94, best shown in FIGURE 12. The extension piece 94 is provided with a tongue 95 which can enter a recess 96 in the tool bar and be locked therein by set screws 97.

The seeds or fertilizer may be delivered to rotating or stationary spreader discs. With the latter the air current striking such discs scatters the seeds which it is carrying.

Figure 16:
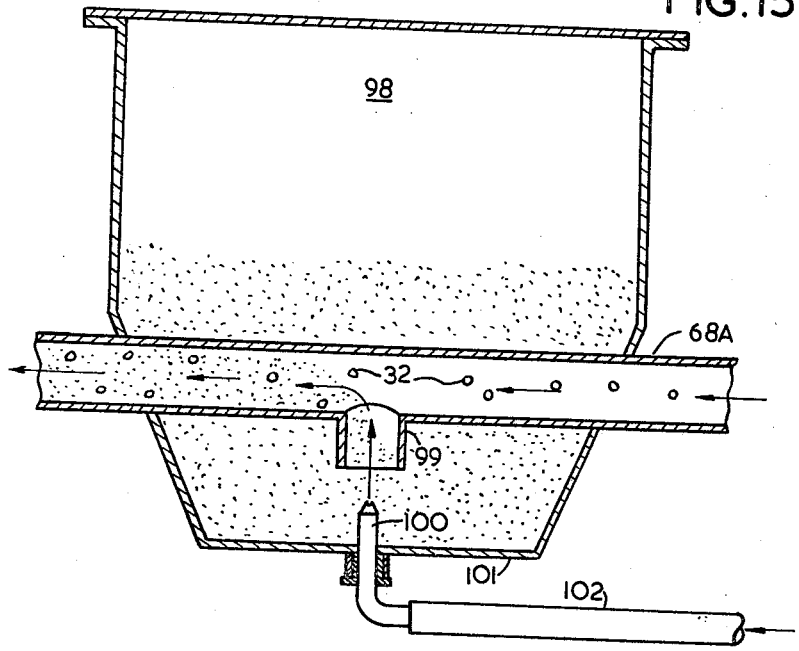
FIGURE 16 is a sectional view of a fertilizer delivery system.

Fertilizer or the like may be injected into one of the hoses 68A carrying seeds from the container 21 as shown in FIGURE 16. In this arrangement, the tube 68A passes through a fertilizer hopper 98. A short branch pipe 99 extends medially downwards from the tube 68 within the container towards an upwardly directed air jet 100 adjustably mounted in the floor 101 of the container 98.

The jet 100 is fed by air pulsations from the pump 46 via a hose 102. The air pulsations force fertilizer into the pipe 99 to be entrained with the air and seeds 32 passing through the hose 68A.

An alternative form of rotor is shown in FIGURE 13. In this case the rotor 23A is built up from a number of discs 103 with integral cylindrical hubs 104. The hubs are provided with relatively large axial bores 105 to decrease their weight. The hubs 104 are also drilled to take elongated clamping bolts 106.

Blanking flanges 107 and 108 are secured to each end of the assembled sets of discs 103 by the clamping bolts which are threadably engaged in tapped blind holes 109 in the flange 108.

A rotor shaft 20A is located in medial bores in the flanges 107 and 108 which are locked to said shaft by set screws 110.

Air passages 111 are bored through the discs 103, hubs 104 and through the flange 108 only, and jets 72 are screwed into the periphery of each disc 103 at the end of each air passage 111. A distributor plate 36 is pressed against the outer face of the flange 108 by a spring 44 as before.

It has been found that the discs 103, of this second form of rotor 23A, cause less disturbance to the seeds 32 resting on the bottom of the container 21 as said rotor rotates. Also the discs 103 require less power to rotate them through the seeds than the tubes 24 used on the rotor 23.

Furthermore, the discs 103 can be cast from aluminum or moulded from synthetic plastic material and thus provide a relatively inexpensive and light weight article.

The invention broadly comprehends all types of seed sowing devices in which the seed is delivered by a current of air and although not preferred it is possible to construct seed sowers in accordance with the invention in which there is no alternate suction and pressure but the seeds are delivered at a metered rate into a container from which they are expelled by a constant air pressure within such container through suitable outlet tubes.

What is claimed is:

1. An agricultural tractor attachment for controlled distribution of granular material to predetermined surface areas, comprising in combination (a) a substantially closed container, (b) a rotor in said container, (c) means mounting said rotor for rotation on a horizontal axis, (d) hub means in said rotor, provided with a plurality of longitudinal bores therethrough, (e) conduit means on said hub extending radially therefrom and having conduits therein which are individually in communication with said bores and extend radially outwardly therefrom to the vicinity of a substantially cylindrical wall in said container, (f) orifice means in the outer end of each of said conduit means, (g) discharge openings in said container wall at a circumferential distance from the bottom of said container and in positions to register temporarily with said orifice means as said rotor rotates, (h) discharge tubes connected with said container and communicating individually with said discharge openings, (i) an air pump having inlet and exhaust means connected therewith, (j) conduit means connected with said inlet and exhaust means of said air pump and communicating in predetermined sequence, with said bores in the rotor hub as the rotor rotates, (k) a source of air pressure, and (l) means connecting said source of air pressure with the interior of said container to continuously supply streams of air under pressure to said discharge tubes, whereby suction by said pump in said orifice means causes said conduit means on the hub to pick up granules from a mass of said granular material resting on the bottom of the container as said conduit means move through said mass, while pressure from said pump in said orifice means as they move past said discharge openings causes said granules to be discharged to said openings and then due to over-pressure in the container caused by said source of air pressure through said discharge tubes to said surface areas in controlled succession.

2. The tractor attachment as set forth in claim 1, including friction disc means for driving said rotor from a front wheel of the tractor, and transmission means with means for controlling the velocity of the rotor from the driver's seat on the tractor.

3. The tractor attachment as set forth in claim 1, in which said conduit means on the hub comprise longitudinally spaced annular discs secured to said hub and provided with said radial conduits.

References Cited

UNITED STATES PATENTS

| | | | |
|---|---|---|---|
| 1,785,945 | 12/1930 | Ezdorf et al. | 222—193 |
| 1,915,541 | 6/1933 | Lenz | 221—211 X |
| 2,798,726 | 7/1957 | Bottlander | 222—177 |
| 2,833,542 | 5/1958 | Martin | 222—177 X |
| 2,906,539 | 9/1959 | Ritter | 222—177 X |
| 3,063,599 | 11/1962 | Kestel | 221—185 X |
| 3,100,462 | 8/1963 | Steele et al. | 221—211 X |
| 3,108,482 | 10/1963 | Polzin | 222—177 X |
| 3,118,571 | 1/1964 | Reynolds | 222—177 |
| 3,202,323 | 8/1965 | Powell | 222—177 |

FOREIGN PATENTS 512,178 8/1939 Great Britain.

SAMUEL F. COLEMAN, Primary Examiner

U.S. Cl. X.R.

111—77